United States Patent [19]
Garrett et al.

[11] Patent Number: 5,248,320
[45] Date of Patent: Sep. 28, 1993

[54] COMPRESSING OXYGEN

[75] Inventors: Michael E. Garrett, Woking, England; Alberto LaCava, South Plainfield, N.J.

[73] Assignee: The BOC Group plc, Windlesham, England

[21] Appl. No.: 975,299

[22] Filed: Nov. 12, 1992

[30] Foreign Application Priority Data

Nov. 11, 1991 [GB] United Kingdom ............... 9124145

[51] Int. Cl.⁵ .................................... B01D 53/04
[52] U.S. Cl. .................................... 95/96; 55/267; 95/130; 95/139; 95/117; 96/130
[58] Field of Search ............... 55/18, 23, 25, 26, 31, 55/33, 62, 68, 74, 75, 161–163, 179, 267–269, 387, 389

[56] References Cited

U.S. PATENT DOCUMENTS

| | | | |
|---|---|---|---|
| 3,085,379 | 4/1963 | Kiyonaga et al. | 55/23 |
| 3,486,297 | 12/1969 | Eisinga et al. | 55/25 X |
| 4,065,272 | 12/1977 | Armond | 55/25 |
| 4,168,149 | 9/1979 | Armond et al. | 55/179 X |
| 4,552,571 | 11/1985 | Dechene | 55/25 X |
| 4,636,226 | 1/1987 | Canfora | 55/179 X |
| 4,673,415 | 6/1987 | Stanford | 55/179 X |
| 4,698,075 | 10/1987 | Dechene | 55/163 |
| 5,071,453 | 12/1991 | Hradek et al. | 55/179 X |
| 5,114,441 | 5/1992 | Kanner et al. | 55/179 X |

FOREIGN PATENT DOCUMENTS 1150952 5/1969 United Kingdom ............... 55/23

*Primary Examiner*—Robert Spitzer
*Attorney, Agent, or Firm*—Coleman R. Reap; Larry R. Cassett

[57] ABSTRACT

A method of compressing oxygen includes passing the oxygen into a vessel 12 containing finely divided material. Next a driving gas, for example, air is compressed to a greater pressure than the oxygen and passed through the vessel 12 and the bed of material contained therein which creates a plug flow effect such that the oxygen is compressed by the air substantially without back-mixing.

14 Claims, 2 Drawing Sheets

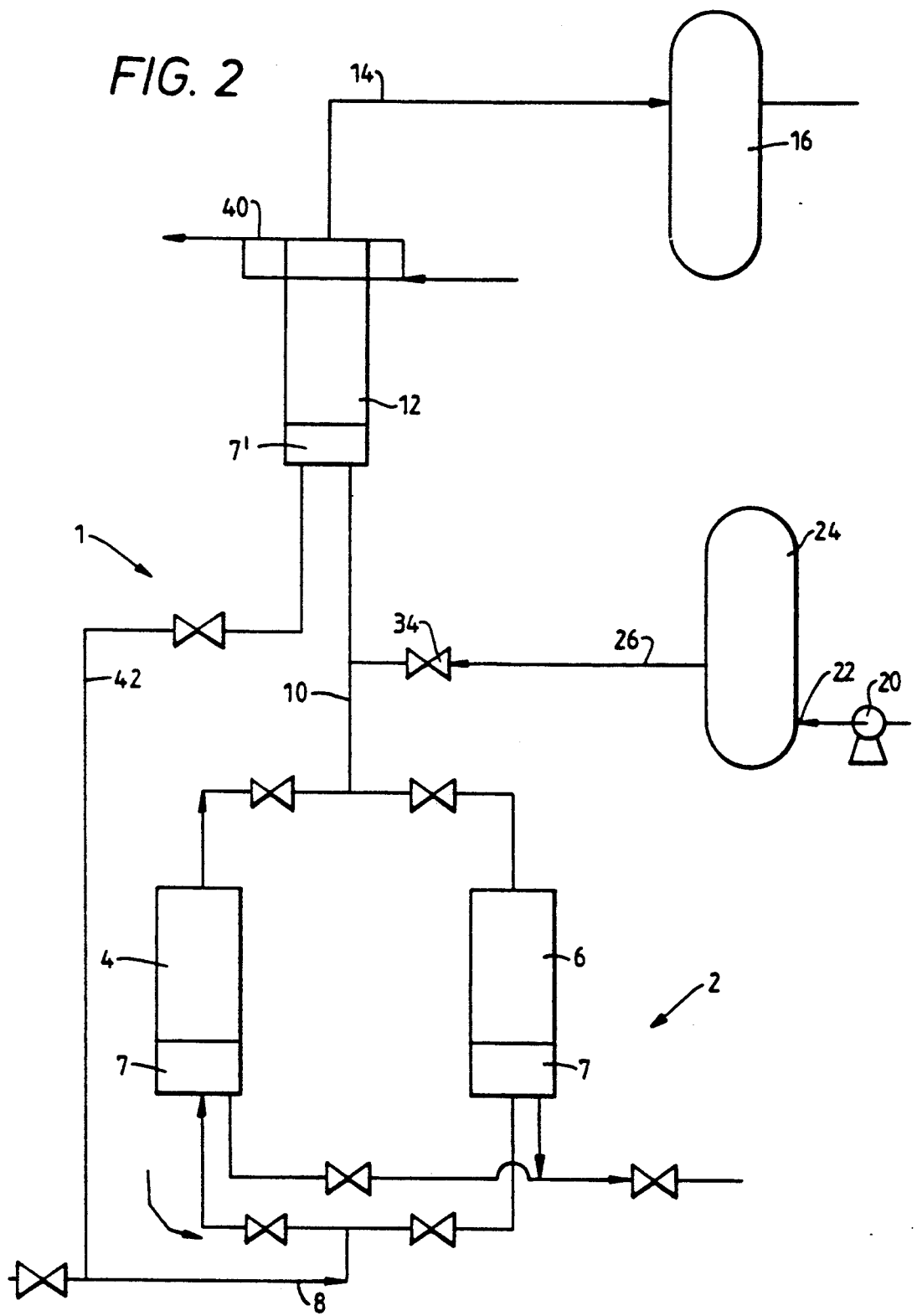

COMPRESSING OXYGEN

TECHNICAL FIELD

The present invention relates to methods of and apparatus for the compression of oxygen.

BACKGROUND OF THE PRIOR ART

It is known to produce an oxygen rich product gas from pressure swing adsorption (PSA) plants. However, the product gas so produced is often at low pressure, that is, either close to atmospheric pressure or about 1 or 2 bar. If oxygen PSA plants are operated with a feed gas pressure which is higher than usual in order to provide the product gas at a higher pressure, then the cycle becomes progressively more inefficient in the use of power since air contains only 21% oxygen of which about half is trapped in the PSA plant so that consequently up to 90% of the initial compression energy can be wasted.

One alternative is to use mechanical compression for the oxygen product gas. However, the mechanical compression of oxygen is a known hazard and machines which meet the various safety requirements are very expensive.

SUMMARY OF THE INVENTION

The present invention provides a method of and an apparatus for compressing oxygen in which there is no direct mechanical action on the oxygen.

According to one aspect of the present invention, a method of compressing oxygen comprises the steps of:
a) passing a predetermined quantity of oxygen at a given pressure into a bed of material;
b) compressing a driving gas to a pressure greater than the given pressure of oxygen; and subsequently
c) passing the driving gas into the bed of material which creates a plug flow effect such that the driving gas compresses the oxygen therein to a preselected pressure substantially without back-mixing.

According to a further aspect of the the present invention, an apparatus for compressing oxygen comprises a source of oxygen under pressure, conduit means for the passage of the oxygen under pressure to a vessel containing a bed of material which creates a plug flow effect when a gas is passed therethrough, means for compressing a driving gas to a pressure greater than the oxygen pressure and conduit means for the passage of the driving gas towards the vessel the arrangement being such that the driving gas on passage through the vessel compresses the oxygen substantially without back-mixing.

Preferably, the source of oxygen is an oxygen PSA plant and the driving gas is air.

BRIEF DESCRIPTION OF THE DRAWINGS

Embodiments of the invention will now be described by way of example, reference being made to the Figures of the accompanying diagrammatic drawings in which:

FIG. 2 is a schematic diagram similar to FIG. 1 but illustrating modifications.

DETAILED DESCRIPTION OF THE INVENTION

Figure 1:
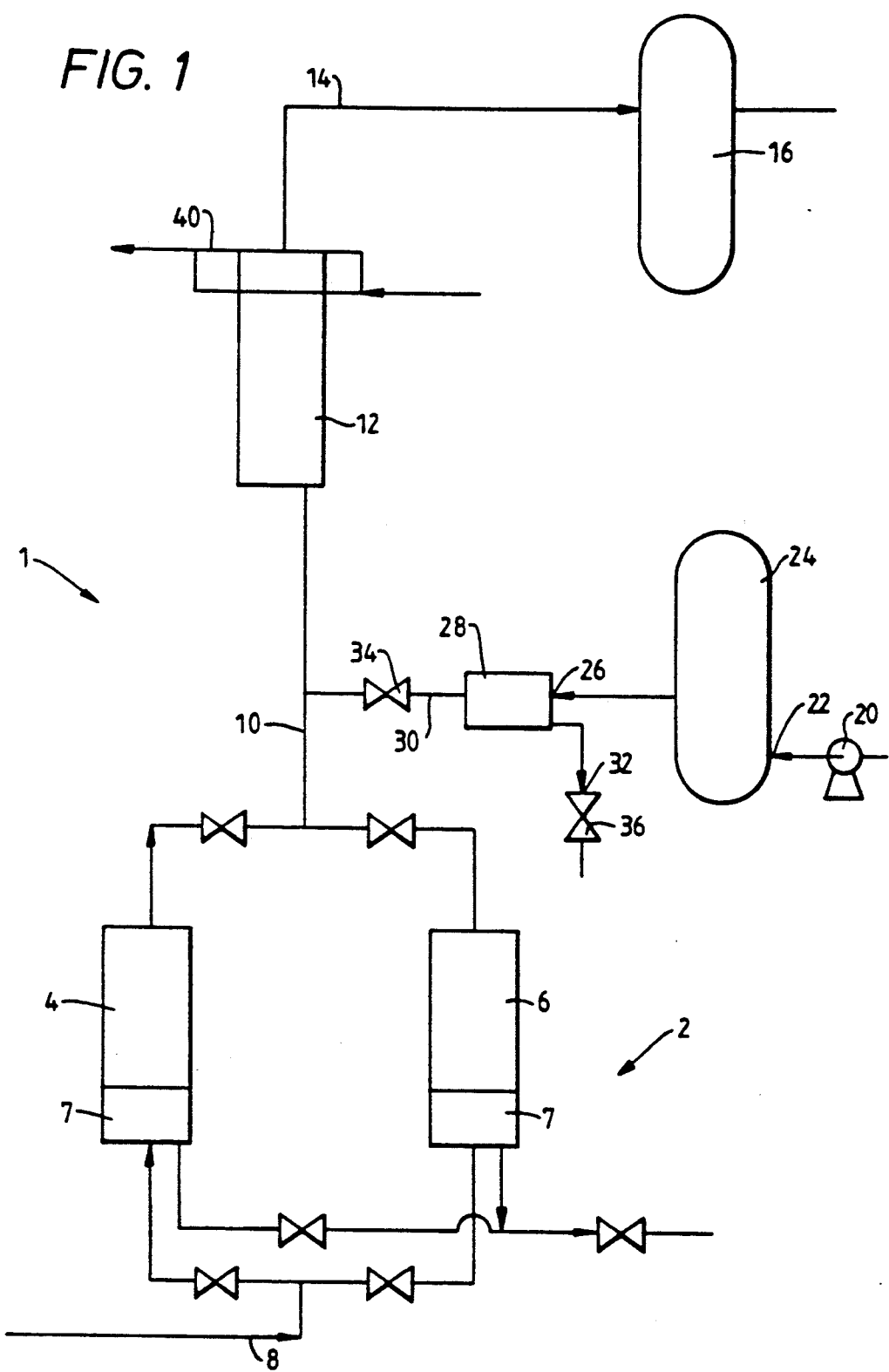
FIG. 1 is a schematic diagram of an apparatus for the compression of oxygen.

As shown in FIG. 1, an apparatus I for the compression of oxygen includes a source of oxygen under pressure in the form of a pressure swing adsorption (PSA) plant 2. The PSA plant 2 as shown in FIG. 1 is known in the art but for clarity will be described briefly as follows.

The PSA plant 2 comprises two vessels 4, 6 each containing a bed of adsorbent material and a desiccant in the form of an alumina layer 7. When air under pressure is passed through an inlet line 8 it is directed to one vessel 4, 6 in a manner known per se where the adsorbent material preferentially adsorbs nitrogen and carbon dioxide relative to oxygen and the alumina layer 7 removes moisture such that dry oxygen enriched product gas exits from the PSA plant 2 via a conduit means 10.

Each vessel 4, 6 alternates with the other to produce oxygen product gas whilst the adsorbent material in the other vessel is being regenerated in a manner known per se.

Conduit means 10 extends to the bottom (as shown) of a vessel 12 which contains a bed of finely divided material which creates a "plug flow effect" when a gas is passed therethrough.

Wherever and whenever used throughout this specification "plug flow effect" means a flow pattern in which successive particles of fluid flow through the bed of material are always in the same order in which they enter the bed, that is, without back-mixing. Examples of suitable bed materials are: finely divided particles and/or multiple layers of mesh and/or material sintered into a solid block. Any material used should not react adversely with oxygen and should not be an adsorbent. A suitable material would be, for example, bronze.

At its upper (as shown) end a conduit means 14 passes from the vessel 12 to an oxygen product receiver 16. Surrounding the vessel 12 adjacent its upper (as shown) end is a cooler 40.

A compressor 20, preferably an oil free compressor, is connected via a line 22 to a surge tank 24. A pipe 26 connects an outlet from the surge tank 24 to a vessel 28 containing a desiccant. A first pipe 30 extends from the vessel 28 to joint the conduit means 10; and a second pipe 32 extends from the vessel 28 to atmosphere. Valves 34 and 36 control the flow of air through the pipes 30 and 32 respectively.

In use, a predetermined quantity of product oxygen from the PSA plant 2, generated, for example, within vessel 4 passes through the conduit means 10 and into the vessel 12. The quantity of product oxygen is preferably controlled by timing means. After the predetermined quantity of oxygen has passed into the vessel 12 the flow of oxygen is stopped and thereafter a driving gas, for example, air from the compressor 20 passes through line 22, surge tank 24, pipe 26, vessel 28, pipe 30 and valve 34 into conduit means 10 and hence into the vessel 12. The flow of air which has been dried by its passage through the vessel 28 will exhibit the plug flow effect as it passes through the bed of material within the vessel 12 and as a consequence there is substantially no back-mixing of the product oxygen with the air. However, the air moving up (as shown) the vessel 12 will compress the oxygen and the oxygen will be forced out of the vessel 12 through the conduit means 14 and into the oxygen product receiver 16 at an elevated pressure.

The flow of air is stopped before the air can pass into the conduit means 14. This is controlled either by timing or an analysis of the gas at the upper end of the vessel 12.

Next, the bed of material is vented to a lower pressure to remove most of the air by opening valves 34 and 36 and then the bed ispurged with some of the product quality oxygen which passes from the receiver 16, conduit means 14 in a countercurrent direction from the top to the bottom of the vessel 12 and hence, as shown, through the conduit means 10, valve 34, pipe 30, vessel 28, pipe 32 and valve 36 to atmosphere.

Product quality gas is then used to backfill the bed of material within the vessel 12 to the PSA discharge pressure.

Any heat generated by the compression of the oxygen at the upper end of the vessel 12 is removed by the cooler 40.

The cycle of operations is then repeated with the oxygen being generated within vessel 6 of the PSA plant 2.

Referring now to FIG. 2 where the same reference numerals indicate the same features referred to in FIG. 1. In the embodiment illustrated in FIG. 2 the vessel 28 is absent and a layer of desiccant 7* is located within the vessel 12 adjacent its lower (as shown) end. Furthermore, conduit means 42 extends from the lower end of the vessel 12 and connects with the line 8. Thus, high pressure air purged from the vessel 12 can be used as part of the feed air to the PSA plant 2.

Although, in the two embodiments described above, the source of oxygen under pressure is an oxygen PSA plant; the source of oxygen under pressure could be, for example, oxygen from a cryogenic air separation unit.

We claim:

1. A method of compressing oxygen comprising the steps of:
   a) passing a predetermined quantity of oxygen at a given pressure into a bed of material;
   b) compressing a driving gas to a pressure greater than the given pressure of oxygen; and subsequently
   c) passing the driving gas into the bed of material which creates a plug flow effect such that the driving gas compresses the oxygen therein to a preselected pressure substantially without back-mixing.

2. A method as claimed in claim 1, in which the oxygen, after compression, is cooled and passed to an oxygen product receiver.

3. A method as claimed in claim 2, in which after a predetermined time the passage of the driving gas through the bed of material is stopped and oxygen from the product receiver is used as a purge gas to drive the driving gas from the bed.

4. A method as claimed in any one of claims 1, 2 or 3, in which the driving gas is air which before passage through the bed is passed through a desiccant.

5. A method as claimed in claim 4, in which the oxygen is produced in a pressure swing adsorption plant, and after compressing the oxygen, the air is returned to form at least a part of a feed gas mixture for the pressure swing adsorption plant.

6. Apparatus for compressing oxygen characterised by a source of oxygen under pressure, conduit means for the passage of the oxygen under pressure to a vessel containing a bed of material which creates a plug flow effect when a gas is passed therethrough, means for compressing a driving gas to a pressure greater than the oxygen pressure and conduit means for the passage of the driving gas towards the vessel the arrangement being such that the driving gas on passage through the vessel compresses the oxygen substantially without back-mixing.

7. Apparatus as claimed in claim 6, in which the bed of material comprises non-adsorbent finely divided particles.

8. Apparatus as claimed in claim 6, in which the bed of material comprises non-adsorbent multiple layers of mesh.

9. Apparatus as claimed in claim 6, in which the bed of material comprises a non-adsorbent block of sintered material.

10. Apparatus as claimed in any one of claim 6 to 9, in which means is provided for cooling the vessel.

11. Apparatus as claimed in any one of claims 6 to 9, in which the source of oxygen is a pressure swing adsorption plant.

12. Apparatus as claimed in claim 11, in which the driving gas is air and a desiccant layer is located between the compressing means and the bed of material.

13. Apparatus as claimed in claim 12, in which the desiccant layer is located within the vessel.

14. Apparatus as claimed in claim 11, in which pipe means extends between the vessel and the feed gas mixture inlet for the PSA plant for the passage therethrough of air driven from the vessel during a purging operation.

* * * * *